No. 647,542. Patented Apr. 17, 1900.
D. P. TUCK.
CANOE.
(Application filed Oct. 2, 1899.)
(No Model.)
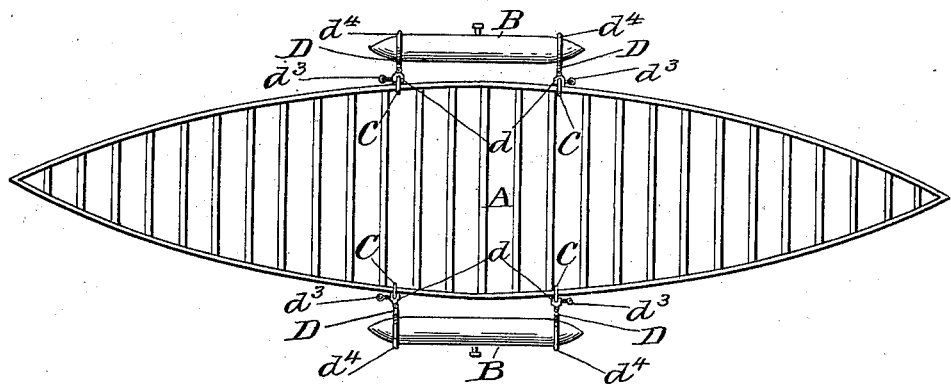
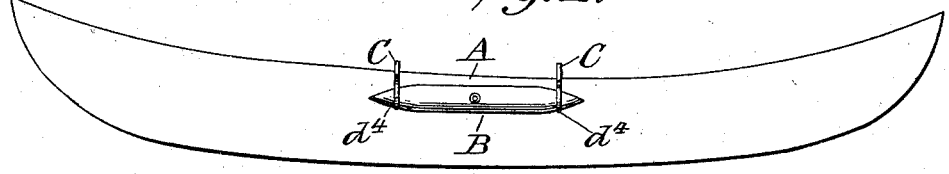
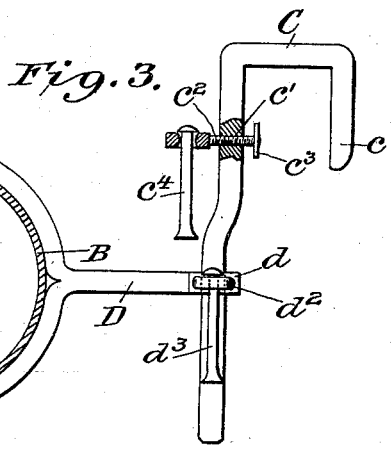
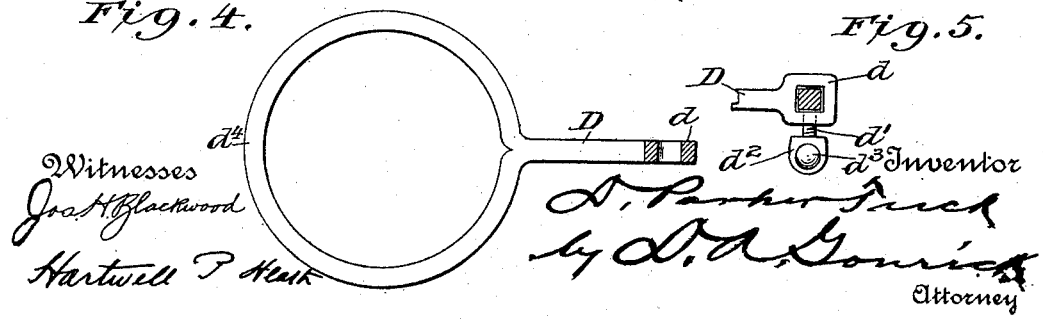
Witnesses
Jos. H. Blackwood
Hartwell P. Heath
Inventor
D. Parker Tuck
by D. A. Gourick
Attorney

UNITED STATES PATENT OFFICE.

DOMINICUS PARKER TUCK, OF DANFORTH, MAINE.

CANOE.

SPECIFICATION forming part of Letters Patent No. 647,542, dated April 17, 1900.

Application filed October 2, 1899. Serial No. 732,387. (No model.)

*To all whom it may concern:*

Be it known that I, DOMINICUS PARKER TUCK, a citizen of the United States, residing at Danforth, in the county of Washington and State of Maine, have invented certain new and useful Improvements in Canoes, of which the following is a specification.

My invention relates to canoes, and especially to birch-bark or canvas canoes, and has for its objects to give greater stability to such boats, to prevent their sinking if swamped, and to enable them to carry more. These objects I accomplish in the manner and by the means hereinafter more fully described in detail, and particularly pointed out in the claims, reference being had to the accompanying drawings, in which like reference-letters indicate like parts in all the figures.

Figure 1 is a top plan view of a canoe with my invention in place. Fig. 2 is a side view of same. Fig. 3 is a detail view of tube-holder. Figs. 4 and 5 are detail views of arm.

A represents an ordinary canoe.

My invention consists of two inflatable cylindrical tubes B, preferably of rubber or other elastic material and having pointed ends, which when not in use can be collapsed and easily stowed away in the canoe A or carried in an overcoat-pocket. Two side clamps C are provided for each side of the canoe A. Said clamps C are square in cross-section, and have a hook $c$ at the upper end adapted to pass over the gunwale of the canoe A. In the outside of said hook $c$ is an interior screw-threaded hole $c'$, in which a screw $c^2$ works. The screw $c^2$ has on its inner end a washer $c^3$, secured to form a cushion to prevent injury to the side of the canoe A. In the outer end of the screw $c^2$ is an eye, in which is placed a small lever $c^4$. The lower part of the clamp C is bent outward sufficiently to permit the eye $d$ on the arm D, hereinafter described, to slide up and down on said clamp C easily. An arm D is provided at its inner end with an eye $d$, adapted to slide on the lower part of the clamp C and provided with a screw $d'$, adapted to secure it at any desired point on the clamp C. The screw $d'$ has in its outer end an eye $d^2$, through which a small lever $d^3$ passes. The arm D extends outward from the side of the canoe A and has on its outer end a large ring $d^4$, adapted to receive and hold the tube B. The hook $c$, the washer $c^3$, and the ring $d^4$, and all parts which come in contact with the canoe A or the tube B are lined with felt or other suitable material to prevent injury to said canoe A or tube B.

The operation of my invention is as follows: Two clamps C are hooked on the gunwale on each side of the canoe A and the screw $c^2$ turned up until it holds said clamp C firmly. The arms D are now passed over the lower ends of the clamps C and slid as far up as desired and there fixed by turning the screw $d'$ up. A tube B is now inflated and passed through the rings $d^4$ on the ends of the arms D on each side of the canoe A, and the device is complete.

Having thus described my invention, what I claim as new, and desire to secure by Letters Patent, is—

1. In combination with a canoe, inflatable tubes, arms carrying such tubes, clamps provided at their upper ends with hooks adapted to fit over the gunwale of the canoe and be firmly secured thereto, said arms adapted to be adjustably secured to said clamps, substantially as shown and described.

2. In combination with a canoe, inflatable tubes, clamps adapted to be secured on the sides of the canoe, arms provided at the outer ends with rings to receive and hold said tubes, said arms adjustably secured on said clamps, substantially as shown and described.

3. In combination with a canoe and inflatable tubes, clamps adapted to be attached to the sides of the canoe and arms provided at their outer ends with rings to receive and hold said tubes said arms adjustably secured to said clamps, substantially as shown and described.

4. In combination with a canoe, inflatable tubes adapted to buoy the canoe up, clamps adapted to be attached to the sides of the canoe and arms provided at their outer ends with rings to receive and hold said tubes, said arms adjustably secured to said clamps, substantially as shown and described.

In testimony whereof I hereto affix my signature in the presence of two witnesses.

D. PARKER TUCK.

Witnesses:
LAURA M. LEWIN,
WILLARD S. LEWIN.